United States Patent
Okada

(10) Patent No.: US 9,878,935 B2
(45) Date of Patent: Jan. 30, 2018

(54) MANUFACTURING METHOD, CONTROL DEVICE, AND MANUFACTURING APPARATUS OF OPTICAL FIBER

(71) Applicant: FUJIKURA LTD., Tokyo (JP)

(72) Inventor: Kenji Okada, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/147,180

(22) Filed: May 5, 2016

(65) Prior Publication Data

US 2016/0347646 A1 Dec. 1, 2016

(30) Foreign Application Priority Data

May 27, 2015 (JP) .................................. 2015-107279

(51) Int. Cl.
*C03B 37/03* (2006.01)
*C03C 25/10* (2006.01)
*G02B 6/02* (2006.01)

(52) U.S. Cl.
CPC .......... *C03B 37/032* (2013.01); *C03C 25/106* (2013.01); *G02B 6/02395* (2013.01)

(58) Field of Classification Search
CPC ........... C03B 37/025–37/0279; C03B 2205/42
See application file for complete search history.

(56) References Cited

U.S. PATENT DOCUMENTS

| 2009/0139269 A1 | 6/2009 | Filippov et al. |
| 2009/0217710 A1* | 9/2009 | Costello .............. C03B 37/0253 65/379 |
| 2011/0274404 A1* | 11/2011 | Okada ............... C03B 37/02718 385/141 |
| 2016/0229136 A1 | 8/2016 | Okada |

FOREIGN PATENT DOCUMENTS

| JP | 62-003037 A | 1/1987 |
| JP | 02-051439 A | 2/1990 |
| JP | 2010-510957 A | 4/2010 |

(Continued)

OTHER PUBLICATIONS

Singh, "Process Control Concepts, Dynamics, and Applications", PHI Learning Private Limited, 2009, pp. 63 and 64.*

(Continued)

*Primary Examiner* — Lisa L Herring
(74) *Attorney, Agent, or Firm* — Sughrue Mion, PLLC

(57) ABSTRACT

A manufacturing method of an optical fiber includes drawing an optical fiber preform and forming a bare optical fiber, coating an outer circumference of the bare optical fiber with a coating layer including a resin, curing the coating layer and forming an optical fiber by curing the coating layer, and changing a direction of the bare optical fiber using one or a plurality of direction changing devices at any position between a position where the bare optical fiber is formed and a position where the coating is performed. The direction changing device includes a guide groove which guides the bare optical fiber, and an internal space portion into which a fluid is introduced from an outside, and in the guide groove, an outlet through which the fluid in the internal space portion is blown to float the bare optical fiber in the guide groove is formed.

4 Claims, 4 Drawing Sheets

(56) References Cited

FOREIGN PATENT DOCUMENTS

| JP | 2011-505326 A | 2/2011 |
| JP | 5571958 B2 | 8/2014 |
| WO | 2008/066661 A2 | 6/2008 |
| WO | 2009070253 A1 | 6/2009 |

OTHER PUBLICATIONS

Communication dated Jul. 28, 2015 issued by the Japanese Patent Office in counterpart Japanese Application No. 2015-024688.
Notice of Allowance dated Mar. 22, 2016 issued by the Japanese Patent Office in counterpart Japanese Application No. 2015-024688.
Communication dated Feb. 21, 2017 issued by the United States Patent and Trademark Office in U.S. Appl. No. 15/017,813.
An Office Action dated Jun. 2, 2017, which issued during the prosecution of U.S. Appl. No. 15/017,813.
Astrom et al., "PID Controllers, 2nd Edition", Instrument Society of America, 1995 (pp. 5, 6, 59-70).
Communication dated Jul. 25, 2017, from the Japanese Patent Office in counterpart Japanese application No. 2015-107279.

* cited by examiner

MANUFACTURING METHOD, CONTROL DEVICE, AND MANUFACTURING APPARATUS OF OPTICAL FIBER

CROSS REFERENCE TO RELATED APPLICATIONS

Priority is claimed on Japanese Patent Application No. 2015-107279, filed on May 27, 2015 the contents of which are incorporated herein by reference.

BACKGROUND OF THE INVENTION

Field of the Invention

The present invention relates to a manufacturing method, a control device, and a manufacturing apparatus of an optical fiber.

Description of Related Art

In general, in order to manufacture an optical fiber, a fiber drawing method of drawing an optical fiber vertically downward from an optical fiber preform along a straight path is employed.

For example, in order to manufacture an optical fiber 5 using a manufacturing apparatus shown in FIG. 5, an optical fiber preform 2 is melted by a heating furnace 11 of a drawing unit 10 and a bare optical fiber 3 is drawn vertically downward therefrom through drawing. The bare optical fiber 3 is cooled by a cooling unit 120 and is thereafter provided with a coating layer by a coating unit 30, thereby obtaining an optical fiber intermediate body 4. The coating layer of the optical fiber intermediate body 4 is cured by a curing unit 40, thereby obtaining an optical fiber 5. The optical fiber 5 is wound by a winder 100 via a pulley 80 and a take-up unit 90.

Regarding a manufacturing method thereof, as a factor that affects productivity, there is a restriction on the height of the entire system. The height of the system is the main factor in the restriction of productivity because there is a need to ensure a sufficient distance for cooling the bare optical fiber obtained by drawing of the optical fiber preform.

When a new facility including a building is established, such restriction can be relaxed. However, this requires an enormous cost. When the enhancement of productivity is further required in the future, there is need to establish a new facility at a higher cost.

As a method of relaxing such restriction, there is a method of using a direction conversion tool having a non-contact holding mechanism.

The non-contact holding mechanism is a mechanism for holding an object under the pressure of a fluid such as air in a non-contact manner, and a direction changing device having the mechanism can change the direction of the bare optical fiber without coming into contact with the bare optical fiber (bare fiber).

When the direction changing device is used, the direction of the bare optical fiber drawn from the optical fiber preform along a first path can be changed to follow a second path that is different from the first path (for example, refer to Japanese Patent No. 5571958 and Japanese Unexamined Patent Application, First Publication No. S62-003037).

Japanese Patent No. 5571958 discloses a manufacturing method of an optical fiber in which a direction conversion tool that has a groove, into which an optical fiber is introduced, and has an opening formed in the groove is used. In this method, gas introduced into the tool through an inflow port is ejected from the opening such that the optical fiber is changed in direction in a state in which the optical fiber is floated by the pressure of the gas.

A direction changing device described in Japanese Unexamined Patent Application, First Publication No. S62-003037 has a guide groove which guides the bare optical fiber, and gas outlets are formed at the bottom surface and both side surfaces of the guide groove (see Example and FIGS. 3 and 4). In the manufacturing method using the direction changing device, the direction of the optical fiber is changed in a state in which the optical fiber is floated by the pressure of the gas blown from the four outlets.

The floatation amount of the bare optical fiber is determined by the balance between the pressure of the gas blown from the inside of the groove of the non-contact holding mechanism, the outer diameter of the bare optical fiber, and a drawing tension applied to the bare optical fiber. Therefore, when the flow velocity of the gas and the outer diameter and drawing tension of the bare optical fiber are constant, the floatation amount of the bare optical fiber becomes constant, resulting in stable drawing.

However, in an actual manufacturing process, due to a variation in the outer diameter of the optical fiber preform, a variation in the drawing velocity of the bare optical fiber, and a decrease in the remaining length of the optical fiber preform, the floatation amount of the bare optical fiber may be changed.

Particularly, in a process (hereinafter, referred to as an acceleration process) of increasing the drawing velocity from a low velocity (for example, approximately 30 m/min) to a steady velocity (generally 1500 m/min or higher) at which a product is manufactured, the outer diameter and drawing tension of the bare optical fiber are not in a state of being controlled to be constant, and the shape of a narrowed portion (neck-down) of the tip end portion of a preform changes with an increase in the drawing velocity minute by minute. Therefore, the outer diameter and drawing tension of the bare optical fiber change, and the floatation amount thereof changes minute by minute.

When the drawing tension is increased after the outer diameter of the bare optical fiber is decreased, the floatation amount of the bare optical fiber is decreased. Therefore, there is concern that the bare optical fiber may come into contact with the inner surface of the groove of the tool. When the bare optical fiber comes into contact with the tool, the bare optical fiber is damaged, and there is a possibility that the strength thereof may decrease.

On the other hand, when the drawing tension is decreased after the outer diameter of the bare optical fiber is increased, the floatation amount of the bare optical fiber is increased, and the stability of the floating state thereof is decreased. Therefore, there is concern that the bare optical fiber may come into contact with the inner surface of the groove of the tool, the bare optical fiber may be damaged, and the strength thereof may decrease.

In addition, when the floating position of the bare optical fiber is changed in the non-contact holding mechanism, the position of the bare optical fiber introduced into the coating unit provided on the downstream side of the non-contact holding mechanism varies, and there is concern that the thickness of the coating may become uneven.

An upstream side means the upstream side in a drawing direction, and a downstream side means the downstream side in the drawing direction. Therefore, a downstream direction is not a constant direction. After the direction of the bare optical fiber is changed by the non-contact holding mechanism, the changed direction is the downstream direction.

The present invention has been made taking the foregoing circumstances into consideration, and provides a manufacturing method, a control device, and a manufacturing apparatus of an optical fiber which achieve the stabilization of a floating position of a bare optical fiber in a direction changing device even when the outer diameter of an optical fiber varies.

SUMMARY OF THE INVENTION

A first aspect of the present invention is a manufacturing method of an optical fiber. The method includes drawing an optical fiber preform and forming a bare optical fiber, coating an outer circumference of the bare optical fiber with a coating layer including a resin, curing the coating layer and forming an optical fiber by curing the coating layer, and changing a direction of the bare optical fiber using one or a plurality of direction changing devices at any position between a position where the bare optical fiber is formed and a position where the coating is performed. The direction changing device includes a guide groove which guides the bare optical fiber, and an internal space portion into which a fluid is introduced from an outside, in the guide groove, an outlet through which the fluid in the internal space portion is blown to float the bare optical fiber in the guide groove is formed, and a position of the bare optical fiber at at least one of the direction changing devices is detected, an outer diameter of the bare optical fiber is measured, and a flow rate of the fluid introduced into the direction changing devices is controlled on the basis of the position and the outer diameter of the bare optical fiber.

In a second aspect of the present invention according to the manufacturing method of an optical fiber of the first aspect described above, the method may further includes determining a target floating position in the direction changing device on the basis of a measurement value of the outer diameter of the bare optical fiber, comparing the target floating position and a result of detection of the position of the bare optical fiber are compared to each other, and controlling the flow rate of the fluid introduced into the direction changing device is controlled so as to reduce the difference therebetween.

In a third aspect of the present invention according to the manufacturing method of an optical fiber of the second aspect described above, the flow rate of the fluid introduced to all the direction changing devices among the plurality of direction changing devices may be controlled so as to reduce the difference between the result of the detection of the position of the bare optical fiber at at least one direction changing device among the plurality of direction changing devices and the target floating position.

In a fourth aspect of the present invention according to the manufacturing method of an optical fiber of the second aspect or the third aspect described above, the target floating position may be determined on the basis of a relative deviation of an optimal floating position of the bare optical fiber obtained in Expression (1):

$$\Delta r = \frac{D - D_0}{2 \times \tan\theta} \quad (1)$$

where $\Delta r$ is the relative deviation [mm] of the optimal floating position from an optimal floating position of a reference bare optical fiber, $\theta$ is an inclination angle [°] of an inner side surface of the guide groove, D is the outer diameter [mm] of the bare optical fiber, and $D_0$ is an outer diameter [mm] of the reference bare optical fiber.

In a fifth aspect of the present invention according to the manufacturing method of an optical fiber of the second aspect or the third aspect described above, before a drawing velocity of the optical fiber reaches a steady level, the target floating position may be determined on the basis of a relative deviation of an optimal floating position of the bare optical fiber obtained in Expression (2):

$$\Delta r = \frac{D - D_0}{2 \times \tan\theta} + \alpha \quad (2)$$

where $\Delta r$ is the relative deviation [mm] of the optimal floating position from an optimal floating position of a reference bare optical fiber, $\theta$ is an inclination angle [°] of an inner side surface of the guide groove, D is the outer diameter [mm] of the bare optical fiber, $D_0$ is an outer diameter [mm] of the reference bare optical fiber, and a is an offset amount [mm].

A sixth aspect of the present invention is a control device which is used in a manufacturing apparatus of an optical fiber. The manufacturing apparatus includes a drawing unit which draws an optical fiber preform and forms a bare optical fiber, a coating unit which coats an outer circumference of the bare optical fiber with a coating layer comprising a resin, and a curing unit which cures the coating layer. The control device includes one or a plurality of direction changing devices which change a direction of the bare optical fiber at any position between the drawing unit and the coating unit, a position detection unit which detects a position of the bare optical fiber in the direction changing device, an outer diameter measurement unit which measures an outer diameter of the bare optical fiber, and a control unit which controls a flow rate of a fluid introduced into the direction changing device on the basis of the position of the bare optical fiber measured by the position detection unit and the outer diameter of the bare optical fiber measured by the outer diameter measurement unit. The direction changing device includes a guide groove which guides the bare optical fiber and an internal space portion into which the fluid is introduced from the outside. In the guide groove, an outlet through which the fluid in the internal space portion is blown to float the bare optical fiber in the guide groove is formed. The control unit detects the position of the bare optical fiber at at least one of the direction changing devices, measures the outer diameter of the bare optical fiber, and controls a flow rate of the fluid introduced into the direction changing devices on the basis of the position and the outer diameter of the bare optical fiber.

In a seventh aspect of the present invention according to the control device of the sixth aspect described above, the control unit may determine a target floating position in the direction changing device on the basis of a measurement value of the outer diameter of the bare optical fiber, may compare the target floating position and a result of detection of the position of the bare optical fiber to each other, and may control the flow rate of the fluid introduced into the direction changing device so as to reduce the difference therebetween.

In an eighth aspect of the present invention according to the control device of the seventh aspect described above, the control unit may determine a target floating position in the direction changing device on the basis of a measurement value of the outer diameter of the bare optical fiber, may compare the target floating position and a result of detection of the position of the bare optical fiber to each other, and may control the flow rate of the fluid introduced into the direction changing device so as to reduce the difference therebetween.

In a ninth aspect of the present invention according to the control device of the seventh aspect or the eighth aspect described above, the control unit may determine the target floating position on the basis of a relative deviation of an optimal floating position of the bare optical fiber obtained in Expression (1):

$$\Delta r = \frac{D - D_0}{2 \times \tan\theta} \quad (1)$$

where $\Delta r$ is the relative deviation [mm] of the optimal floating position from an optimal floating position of a reference bare optical fiber, $\theta$ is an inclination angle [°] of an inner side surface of the guide groove, D is the outer diameter [mm] of the bare optical fiber, and $D_0$ is an outer diameter [mm] of the reference bare optical fiber.

In a tenth aspect of the present invention according to the control device of the seventh aspect or the eighth aspect described above, before a drawing velocity of the optical fiber reaches a steady level, the control unit may determine the target floating position on the basis of a relative deviation of an optimal floating position of the bare optical fiber obtained in Expression (2):

$$\Delta r = \frac{D - D_0}{2 \times \tan\theta} + \alpha \quad (2)$$

where $\Delta r$ is the relative deviation [mm] of the optimal floating position from an optimal floating position of a reference bare optical fiber, $\theta$ is an inclination angle [°] of an inner side surface of the guide groove, D is the outer diameter [mm] of the bare optical fiber, $D_0$ is an outer diameter [mm] of the reference bare optical fiber, and a is an offset amount [mm].

An eleventh aspect of the present invention is a manufacturing apparatus of an optical fiber includes the control device according to any one of the sixth aspect to the tenth aspect described above, the drawing unit which draws an optical fiber preform and forms the bare optical fiber, the coating unit which coats the outer circumference of the bare optical fiber with the coating layer comprising the resin, and the curing unit which cures the coating layer.

For example, in an acceleration process, the outer diameter of the bare optical fiber is likely to fluctuate. Even after a drawing velocity reaches a steady level, there is a possibility that the outer diameter of the bare optical fiber may vary due to an effect of defects such as residual foam and incorporated foreign materials in the optical fiber preform.

According to the aspect of the present invention, since the flow rate of the fluid introduced into the direction changing devices is controlled on the basis of the position and the outer diameter of the bare optical fiber in the direction changing devices, the floatation amount of the bare optical fiber can be regulated by controlling the flow velocity of the fluid discharged from an outlet to the guide groove in the direction changing devices.

Therefore, the contact between the bare optical fiber and an inner side surface of the guide groove due to an insufficient floatation amount caused by a variation in the outer diameter of the bare optical fiber can be avoided. In addition, when the floatation amount of the bare optical fiber becomes too high due to a variation in the outer diameter of the bare optical fiber, a floating state thereof may become unstable. However, by adjusting the floatation amount of the bare optical fiber, the floating state is stabilized, and the contact between the bare optical fiber and the inner side surface of the guide groove can be prevented.

Therefore, the bare optical fiber is not damaged by the direction changing devices, and the operation ratio of the manufacturing apparatus is increased, resulting in an enhancement of productivity. Therefore, a reduction in manufacturing costs can be achieved. In addition, the optical fiber can be manufactured with a good yield.

Furthermore, a floating position of the bare optical fiber in the direction changing devices becomes stable, and thus the position of the bare optical fiber that enters the coating unit becomes constant. Therefore, the coating is prevented from having an uneven thickness, and the optical fiber with stable quality can be manufactured.

DETAILED DESCRIPTION OF THE PREFERRED EMBODIMENTS

Figure 1:
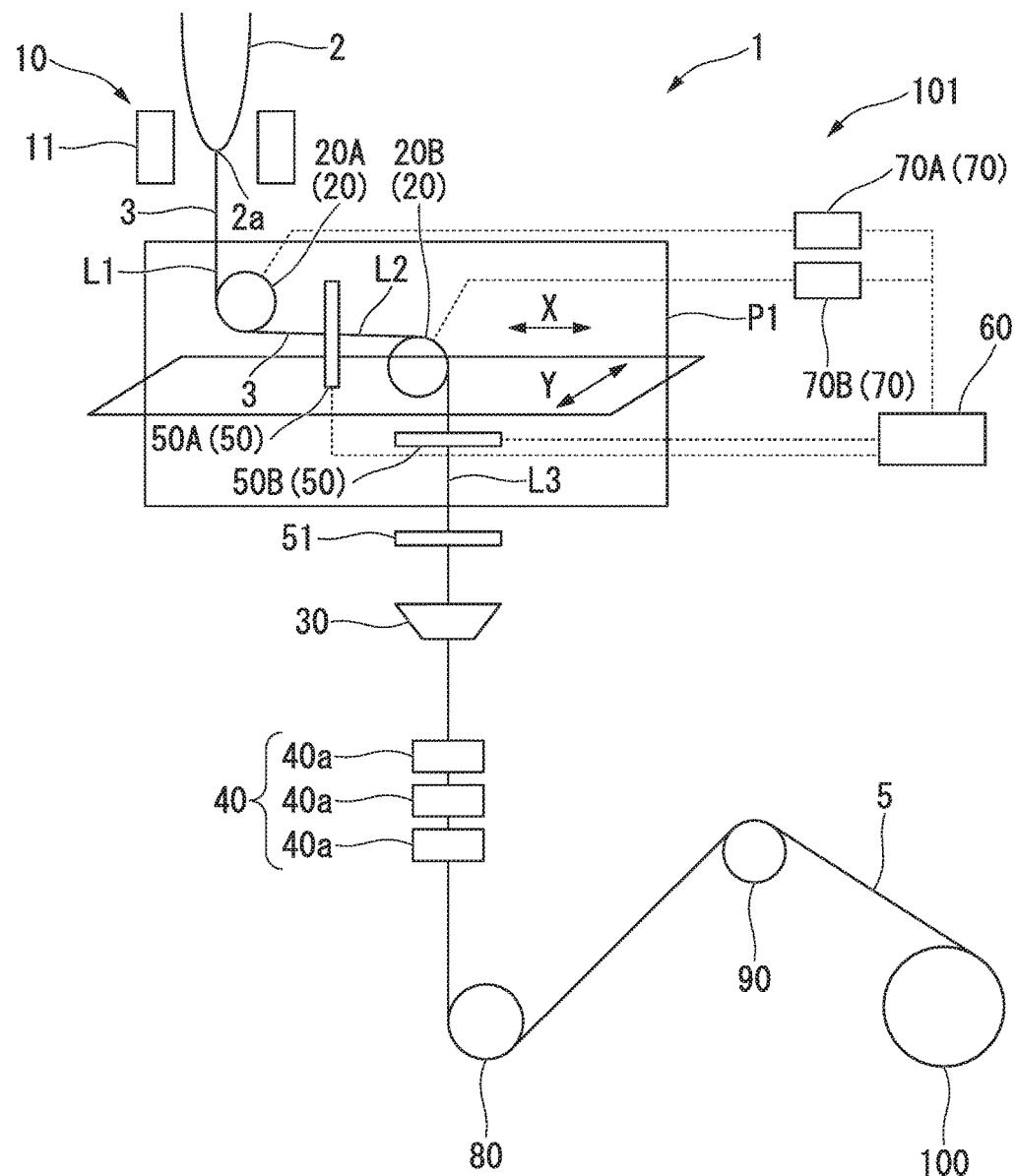
FIG. 1 is a schematic view showing the schematic configuration of an embodiment of a manufacturing apparatus of an optical fiber of the present invention.

FIG. 1 is a schematic view showing the schematic configuration of a manufacturing apparatus 1 which is an embodiment of a manufacturing apparatus of an optical fiber according to the present invention.

The manufacturing apparatus 1 includes, in the order from the upstream side toward the downstream side in a drawing direction, a drawing unit 10, direction changing devices 20 (20A and 20B), a coating unit 30, a curing unit 40, a position detection unit 50, an outer diameter measurement unit 51, a control unit 60, flow rate regulators 70, a pulley 80, a take-up unit 90, and a winder 100.

The direction changing devices 20, the position detection unit 50, the outer diameter measurement unit 51, the control unit 60, and the flow rate regulators 70 (70A and 70B) constitute a control device 101.

The drawing unit 10 includes a heating furnace 11, and an optical fiber preform 2 is heated by the heating furnace 11 to form a bare optical fiber 3 through drawing.

A tip end portion 2a is the tip end portion of a narrowed portion (neck-down) of the optical fiber preform 2 which is heated and melted.

The direction changing device 20 changes the direction of the bare optical fiber 3. In the manufacturing apparatus 1 shown in FIG. 1, the two direction changing devices 20 are used. The direction changing devices 20 include the first direction changing device 20A and the second direction changing device 20B in the order from the upstream side to the downstream side in the drawing direction.

The first direction changing device 20A allows the bare optical fiber 3 drawn vertically downward (first path L1) from the optical fiber preform 2 to be changed in direction by 90° and be directed horizontally (second path L2).

A plane including the first path L1 and the second path L2 is referred to as P1. An X direction is a direction along the second path L2 in the plane P1, and a Y direction is a direction perpendicular to the plane P1.

The second direction changing device 20B allows the bare optical fiber 3 to be directed vertically downward (third path L3) by changing the direction of the bare optical fiber 3 by 90°.

Hereinafter, the structure of the direction changing device 20 will be described.

Figure 3:
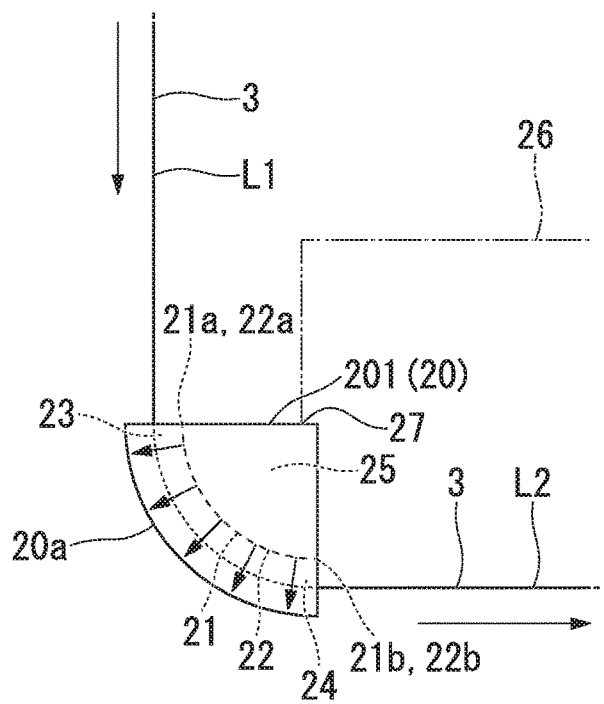
FIG. 3 is a front view showing an example of the direction changing device.

A direction changing device 201 shown in FIG. 3 is a first example of the direction changing device 20, and can change the direction of the bare optical fiber 3 by 90°.

The direction changing device 201 is formed in a quadrant shape in a plan view, and has a guide groove 21 formed in an outer circumferential surface 20a along the entire circumferential length. The direction changing device 201 is provided in a posture such that the center axis direction thereof is coincident with the Y direction, and a radial direction R (see FIG. 2) is directed along the plane P1 (see FIG. 1).

Here, a direction along the outer circumferential surface 20a having an arc shape in the plan view is referred to as a circumferential direction.

In the bottom portion of the guide groove 21, an outlet 22 for a fluid (air or the like) for floating the bare optical fiber 3 disposed along the guide groove 21 is formed along the guide groove 21. The outlet 22 is formed over the entire length of the guide groove 21.

One end 22a of the outlet 22 reaches a first end 21a of the guide groove 21, and a second end 22b reaches the other end 21b.

Figure 2:
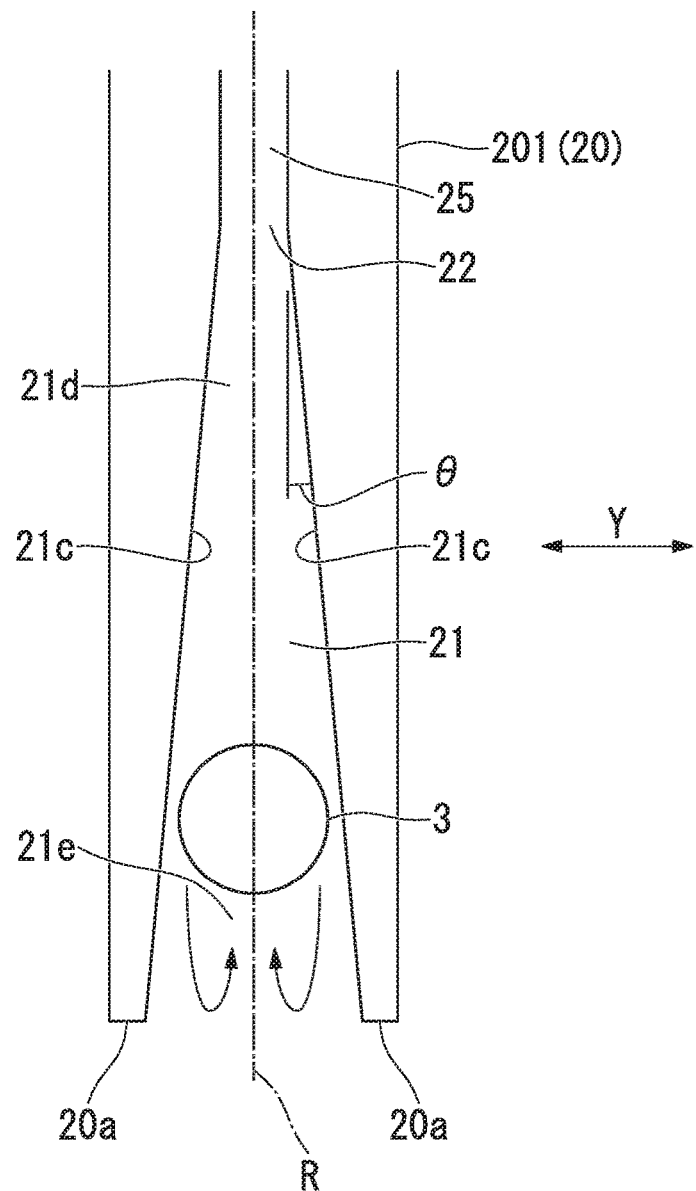
FIG. 2 is a schematic view showing the sectional structure of a direction changing device of the manufacturing apparatus shown in FIG. 1.

As shown in FIG. 2, the direction changing device 201 is configured to discharge the fluid (for example, air) in an internal space portion (fluid accumulation portion 25) ensured in the direction changing device 201 toward the inside of the guide groove 21 through the outlet 22.

The direction changing device 201 may be configured to allow the fluid to be introduced into the fluid accumulation portion 25 from the outside and be discharged to the guide groove 21 through the outlet 22.

As shown in FIG. 3, in the direction changing device 201, it is preferable that an introduction portion 27 to which an introduction path 26 that introduces the fluid to the fluid accumulation portion 25 from the outside is connected is formed. The introduction portion 27 is, for example, an introduction port for the fluid.

As shown in FIG. 2, it is preferable that the guide groove 21 is formed to be inclined with respect to the radial direction R such that the interval (a dimension in the Y direction) between inner side surfaces 21c and 21c gradually increases toward the outside in the radial direction. It is preferable that the two inner side surfaces 21c and 21c have the same inclination angle θ with respect to the radial direction R.

In the direction changing device 201 shown in FIG. 3, the bare optical fiber 3 enters one end 21a of the guide groove 21 having a quadrant shape and exits the other end 21b such that the change in direction by 90° is achieved. A wire entrance portion 23 that the bare optical fiber 3 enters is a portion including the first end 21a of the guide groove 21, and a wire exit portion 24 that the bare optical fiber 3 exits is a portion including the second end 21b of the guide groove 21.

Figure 4:
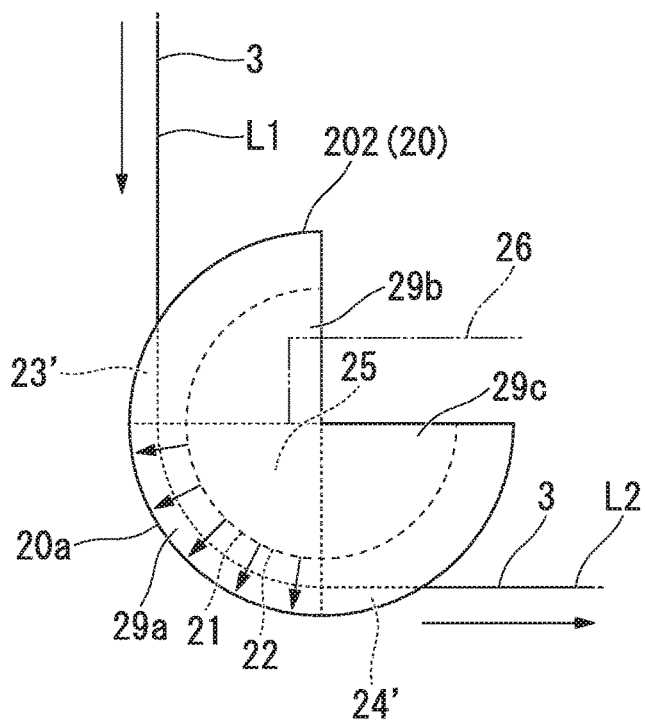
FIG. 4 is a front view showing a modification example of the direction changing device shown in FIG. 3.
Figure 5:
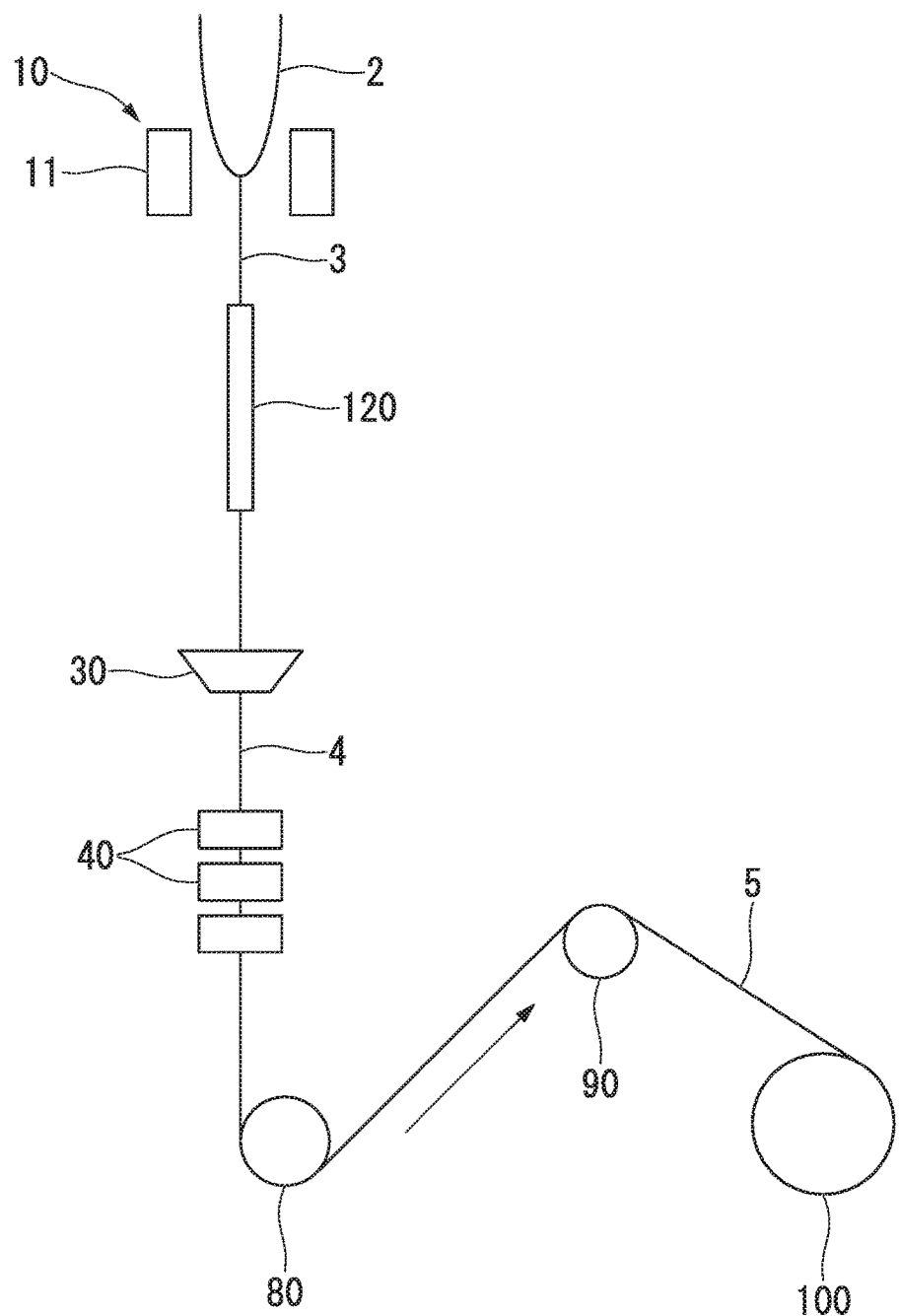
FIG. 5 is a schematic view showing an example of a manufacturing apparatus of an optical fiber in the related art.

A direction changing device 202 shown in FIG. 4 is a modification example of the direction changing device 201 and has a ¾ circle shape in the plan view. Hereinafter, like elements having the same configurations as those of the above-described configuration are denoted by like reference numerals, and a description thereof will be omitted.

The direction changing device 202 has a structure in which, to the wire entrance side and the wire exit side of a body portion 29a having the same structure as that of the direction changing device 201, auxiliary portions 29b and 29c having the same structure as that of the body portion 29a are connected. The direction changing device 202 enters the guide groove 21 of the body portion 29a through a wire entrance portion 23' of the bare optical fiber 3, is changed in direction by 90° in the body portion 29a, then exits a wire exit portion 24'. Therefore, the basic function thereof is the same as that of the direction changing device 201.

The direction changing device 201 or 202 can change the direction of the bare optical fiber 3 by 90° and thus can be used as the direction changing device 20A or 20B shown in FIG. 1.

As shown in FIG. 1, the position detection unit 50 is provided on the downstream side in the drawing direction of the second direction changing device 20B, and detects the position of the bare optical fiber 3 on the third path L3. As the position detection unit 50, for example, a laser (optical) position sensor may be used. For example, the laser position sensor can receive light that is emitted toward the bare optical fiber 3 from a light source (laser light source) with a detector provided to oppose the light source and can detect the position of the bare optical fiber 3 on the basis of the light.

When the floatation amount of the bare optical fiber 3 in the second direction changing device 20B fluctuates, the position in the X direction of the bare optical fiber 3 on the third path L3 is changed. Therefore, the position detection unit 50 can detect the floatation amount of the bare optical fiber 3 in the second direction changing device 20B on the basis of the positional information of the bare optical fiber 3.

The position detection unit 50 outputs a position signal (detection signal) to the control unit 60 on the basis of the information regarding the position of the bare optical fiber 3 (the result of the detection of the position of the bare optical fiber 3).

The outer diameter measurement unit 51 is provided on the downstream side in the drawing direction of the position detection unit 50 and can measure the outer diameter of the bare optical fiber 3. It is preferable that the outer diameter measurement unit 51 can measure the outer diameter of the coating layer without coming into contact with the bare optical fiber 3.

As the outer diameter measurement unit 51, for example, an optical measurement device provided with a light source and a detector may be used. For example, the measurement device emits light from a light source (laser light source or the like) provided at a position on a side of the bare optical fiber 3, receives the forward-scattered light with a detector provided to oppose the light source, and analyzes the detected pattern or intensity, thereby measuring the bare optical fiber 3.

The position detection unit 51 may be provided between the position detection unit 50 and the coating unit 30.

The outer diameter measurement unit 51 outputs an outer diameter signal (measurement signal) to the control unit 60 on the basis of the outer diameter measurement value.

The position where the outer diameter measurement unit 51 is provided is not particularly limited as long as the outer diameter of the bare optical fiber 3 can be measured. For example, the outer diameter measurement unit 51 may also be provided at any position between the heating furnace 11 and the coating unit 30.

The flow rate regulator 70 can regulate the flow rate of the fluid introduced into the direction changing devices 20A and 20B. For example, the flow rate regulators 70 may be provided on introduction paths (for example, the introduction path 26 shown in FIG. 3) on which the fluid is introduced into the direction changing devices 20A and 20B. As the flow rate regulator 70, a mass flow controller (MFC) or the like may be used.

In the manufacturing apparatus 1 shown in FIG. 1, the two flow rate regulators 70 are used. In the two flow rate regulators 70, the flow rate regulator 70 which regulates the flow rate of the fluid introduced into the first direction changing device 20A is referred to as the first flow rate regulator 70A, and the flow rate regulator 70 which regulates the flow rate of the fluid introduced into the second direction changing device 20B is referred to as the second flow rate regulator 70B.

The control unit 60 outputs control signals to the flow rate regulators 70A and 70B on the basis of the position signal from the position detection unit 50 and the outer diameter signal from the outer diameter measurement unit 51, and the flow rate regulators 70A and 70B control the flow rate of the fluid introduced into the direction changing devices 20A and 20B on the basis of the control signals, thereby controlling the floatation amount of the bare optical fiber 3 in the direction changing devices 20A and 20B.

The coating unit 30 applies a coating material such as a urethane acrylate-based resin to the outer circumference of the bare optical fiber 3 to form a coating layer, thereby obtaining an optical fiber intermediate body 4.

The resin coating is, for example, a two-layer coating obtained by applying a material for a primary coating layer having a low Young's modulus to the inside and applying a material for a secondary coating layer having a high Young's modulus to the outside. The material that is used is, for example, a UV-curable resin.

The coating unit 30 may have a configuration in which the primary coating layer and the secondary coating layer are separately applied, or may also have a configuration in which the primary coating layer and the secondary coating layer are simultaneously applied.

The curing unit 40 includes one or a plurality of UV lamps 40a and cures the coating layer of the optical fiber intermediate body 4 to form the optical fiber 5. For example, the curing unit 40 includes the plurality of UV lamps 40a provided with a space interposed therebetween, through which the optical fiber intermediate body 4 passes.

The pulley 80 can change the direction of the optical fiber 5.

The take-up unit 90 is, for example, a take-up capstan, and determines the drawing velocity. The drawing velocity is, for example, 1500 m/min or higher.

The winder 100 is, for example, a winding bobbin for winding the optical fiber 5.

Next, an embodiment of a manufacturing method of an optical fiber of the present invention will be described by exemplifying a case of using the manufacturing apparatus 1.

(Drawing Process)

As shown in FIG. 1, in the drawing unit 10, the optical fiber preform 2 is heated and the bare optical fiber 3 is formed through drawing.

The outer diameter of the optical fiber preform 2 is, for example, 100 mm or greater, and the length of the optical fiber 5 produced from a single optical fiber preform 2 is, for example, thousands of kilometers.

(Change in Direction by Direction Changing Devices)

The bare optical fiber 3 drawn vertically downward (the first path L1) from the optical fiber preform 2 is directed horizontally (the second path L2) by being changed in direction by 90° in the first direction changing device 20A.

The bare optical fiber 3 is directed vertically downward (the third path L3) by being changed in direction by 90° in the second direction changing device 20B.

As shown in FIG. 2, in the direction changing devices 20A and 20B, the bare optical fiber 3 can be floated by discharging the fluid (for example, air) in the fluid accumulation portion 25 toward the inside of the guide groove 21 through the outlet 22. Specifically, the difference in pressure between a deep portion 21d and a shallow portion 21e of the guide groove 21 is increased by the discharged air, and thus a radially outward force is exerted on the bare optical fiber 3, thereby floating the bare optical fiber 3.

The direction of the bare optical fiber 3 can be changed by the direction changing devices 20A and 20B without coming into contact with the bare optical fiber 3. The direction changing devices 20A and 20B rarely apply resistance (for example, the rotational resistance of a pulley) unlike a contact direction changing device (for example, pulley).

Since the direction of the bare optical fiber 3 is changed by the direction changing devices 20A and 20B, a distance for sufficiently cooling the bare optical fiber is ensured without increasing the height of the entire system, thereby enhancing productivity.

The floatation amount of the bare optical fiber 3 is determined by the balance between the flow velocity of the fluid blown from the outlet 22 into the guide groove 21, the drawing tension applied to the bare optical fiber 3, and the outer diameter of the bare optical fiber 3.

For example, in a case where the drawing tension is constant, the floatation amount of the bare optical fiber 3 increases as the flow velocity of the fluid increases, and the floatation amount of the bare optical fiber 3 decreases as the flow velocity of the fluid decreases. In a case where the flow velocity of the fluid is constant, the floatation amount of the bare optical fiber 3 decreases as the drawing tension increases, and the floatation amount of the bare optical fiber 3 increases as the drawing tension decreases.

In a case where the drawing tension is constant and the flow velocity of the fluid is also constant, the floatation amount increases as the outer diameter of the bare optical fiber 3 increases, and the floatation amount decreases as the outer diameter of the bare optical fiber 3 decreases.

As shown in FIG. 1, in the manufacturing method of this embodiment, as described later in detail, the flow rate of the fluid introduced into the direction changing devices 20A and 20B is controlled on the basis of the position information of the bare optical fiber 3 from the position detection unit 50 and the information regarding the outer diameter of the bare optical fiber 3 from the outer diameter measurement unit 51.

In this control method, a change in the position in the X direction of the bare optical fiber 3 on the third path L3 due to a fluctuation in the floatation amount of the bare optical fiber 3 in the second direction changing device 20B is used.

The position detection unit 50 outputs the position signal to the control unit 60 on the basis of the positional information of the bare optical fiber 3 on the third path L3. The position signal is a signal corresponding to the position in the X direction of the bare optical fiber 3 in the guide groove 21 in the second direction changing device 20B.

The control unit 60 outputs the control signals to the flow rate regulators 70A and 70B on the basis of the position signal from the position detection unit 50, and the flow rate regulators 70A and 70B control the flow rates of the fluid introduced into the direction changing devices 20A and 20B on the basis of the control signals. Accordingly, by controlling the flow velocity of the fluid discharged from the outlet 22 to the guide groove 21 in the direction changing devices 20A and 20B, the floatation amount of the bare optical fiber 3 in the direction changing devices 20A and 20B is regulated.

For example, when the bare optical fiber 3 on the third path L3 is displaced in a depth direction of the guide groove 21 of the direction changing device 20B as the floatation amount of the bare optical fiber 3 decreases due to an increase in the drawing tension, the control unit 60 increases the flow rate of the fluid introduced into the direction changing devices 20A and 20B. Accordingly, the flow velocity of the fluid discharged from the outlet 22 to the guide groove 21 in the direction changing devices 20A and 20B increases, and the floatation amount of the bare optical fiber 3 is recovered.

On the other hand, when the bare optical fiber 3 on the third path L3 is displaced in a direction opposite to the depth direction of the guide groove 21 of the direction changing device 20B as the floatation amount of the bare optical fiber 3 increases due to a decrease in the drawing tension, the control unit 60 decreases the flow rate of the fluid introduced into the direction changing devices 20A and 20B. Accordingly, the flow velocity of the fluid discharged from the outlet 22 to the guide groove 21 in the direction changing devices 20A and 20B decreases, and the floatation amount of the bare optical fiber 3 is reduced.

In this embodiment, the floatation amount of the bare optical fiber can be adjusted by finely regulating the flow rate of the fluid introduced into the direction changing devices 20A and 20B on the basis of the information regarding the outer diameter of the bare optical fiber 3. A detailed description is provided below.

The outer diameter measurement unit 51 measures the outer diameter of the bare optical fiber 3 on the third path L3 and outputs the outer diameter signal to the control unit 60 on the basis of the measurement value.

The control unit 60 determines a target floating position of the bare optical fiber 3 in the direction changing devices 20A and 20B on the basis of the outer diameter signal.

For example, the target floating position of the bare optical fiber 3 can be determined as follows.

As shown in FIG. 2, in the direction changing devices 20A and 20B, the inclination angle of the inner side surfaces 21c and 21c with respect to the radial direction R is referred to as $\theta$[°]. The outer diameter of the bare optical fiber 3 is referred to as D [mm]. The outer diameter of the bare optical fiber 3 as a reference (hereinafter, referred to as a reference bare optical fiber 3) is referred to as $D_0$ [mm]. The outer diameter $D_0$ is, for example, 0.125 [mm].

A relative deviation $\Delta r$ [mm] (distance in the radial direction R) of an optimal floating position of the bare optical fiber 3 (from an optimal floating position of the reference bare optical fiber) for allowing the gap between the bare optical fiber 3 and the inner side surface 21c of the guide groove 21 to be constant can be calculated by the following Expression (1):

$$\Delta r = \frac{D - D_0}{2 \times \tan\theta} \quad (1)$$

where $\Delta r$ is the relative deviation [mm] of the optimal floating position from the optimal floating position of the reference bare optical fiber, $\theta$ is the inclination angle [°] of the inner side surface of the guide groove, D is the outer diameter [mm] of the bare optical fiber, and $D_0$ is the outer diameter [mm] of the reference bare optical fiber.

The relative deviation $\Delta r$ represents a relative deviation [mm] of the optimal floating position from the reference position (the optimal floating position of the reference bare optical fiber 3). The above-mentioned target floating position can be determined on the basis of the relative deviation $\Delta r$. For example, a position deviated from the reference position (toward the outside in the radial direction R) by $\Delta r$ may be determined as the target floating position.

The optimal floating position is determined with reference to whether or not the contact between the bare optical fiber 3 and the inner side surface 21c of the guide groove 21 is reliably avoided, as an indicator. The optimal floating position can be experimentally obtained by, for example, an optical fiber manufacturing test.

In practice, in an acceleration process (in a stage before the drawing velocity reaches a steady level in an optical fiber manufacturing process), there may be a delay in adjusting the floatation amount due to various factors. Examples of the factors include a delay (hysteresis) in response to a change in the outer diameter of the bare optical fiber 3 and a delay caused by the distance between the direction changing devices 20A and 20B and the outer diameter measurement unit 51, which are separated from each other.

Therefore, the above-mentioned target floating position may be calculated by the following Expression (2):

$$\Delta r = \frac{D - D_0}{2 \times \tan\theta} + \alpha \quad (2)$$

where $\Delta r$ is the relative deviation [mm] of the optimal floating position from the optimal floating position of the reference bare optical fiber, $\theta$ is the inclination angle [°] of the inner side surface of the guide groove, D is the outer diameter [mm] of the bare optical fiber, $D_0$ is the outer diameter [mm] of the reference bare optical fiber, and $\alpha$ is the offset amount [mm].

$\alpha$ is an offset amount in the radial direction R, and may be determined according to the factor of the delay in adjusting the floatation amount. Specifically, when $\alpha$ increases, the floatation amount becomes excessively high, resulting in the degradation of stability. Therefore, in consideration of the stability of the floatation amount, 0 mm<$\alpha$≤approximately 1 mm is preferable.

By employing Expression (2), the bare optical fiber 3 can be reliably prevented from coming into contact with the inner side surface 21c of the guide groove 21 even in a case where there is a delay in adjusting the floatation amount in a stage before the drawing velocity reaches a steady level.

After the drawing velocity and the outer diameter of the bare optical fiber 3 reach steady levels, the flow rate of the introduced fluid may be controlled by setting the offset amount $\alpha$ to zero (that is, by employing Expression (1)).

In the control unit 60, the positional information of the bare optical fiber 3 obtained by the position signal from the position detection unit 50 and the target floating position are compared to each other, and the flow rate of the fluid introduced into the direction changing devices 20A and 20B is finely regulated so as to reduce the deviation between the position of the bare optical fiber 3 and the target floating position.

For example, in a case where the outer diameter of the bare optical fiber 3 decreases and the floatation amount of the bare optical fiber 3 becomes lower than the floatation amount at the target floating position corresponding to the outer diameter, the control unit 60 increases the flow rate of the fluid introduced into the direction changing devices 20A and 20B using the flow rate regulators 70A and 70B. Accordingly, the flow velocity of the fluid discharged from the outlet 22 to the guide groove 21 is increased, and an insufficient floatation amount of the bare optical fiber 3 is prevented.

On the other hand, in a case where the outer diameter of the bare optical fiber 3 increases and the floatation amount of the bare optical fiber 3 becomes higher than the floatation amount at the target floating position corresponding to the outer diameter, the control unit 60 decreases the flow rate of the fluid introduced into the direction changing devices 20A and 20B using the flow rate regulators 70A and 70B. Accordingly, the flow velocity of the fluid discharged from the outlet 22 to the guide groove 21 is decreased, and the floatation amount of the bare optical fiber 3 is suppressed.

In an initial stage of the manufacturing of the optical fiber 5, the drawing velocity is low and the outer diameter of the bare optical fiber 3 is likely to fluctuate. However, the drawing velocity is increased to reach a steady level and a fluctuation in the outer diameter of the bare optical fiber 3 may be reduced.

In the acceleration process, the outer diameter of the bare optical fiber 3 is likely to fluctuate, and thus the floatation amount of the bare optical fiber 3 is likely to fluctuate. Even after the drawing velocity reaches a steady level, there is a possibility that the outer diameter of the bare optical fiber 3 may vary due to the effect of defects such as residual foam and incorporated foreign materials.

In the manufacturing method of this embodiment, the contact between the bare optical fiber 3 and the inner side surface 21c of the guide groove 21 due to an insufficient floatation amount caused by a variation in the outer diameter of the bare optical fiber 3 can be avoided.

In addition, when the floatation amount of the bare optical fiber 3 becomes too high due to a variation in the outer diameter of the bare optical fiber 3, the floating state thereof may become unstable. However, by adjusting the floatation amount of the bare optical fiber 3, the floating state is stabilized, and the contact between the bare optical fiber 3 and the inner side surface 21c of the guide groove 21 can be prevented.

As a control method, feedback control such as PID control is preferable. Accordingly, the flow rate of the fluid can be controlled with good responsiveness.

(Coating Process)

In the coating unit 30, the outer circumference of the bare optical fiber 3 is coated with a coating material such as a urethane acrylate-based resin to form the coating layer, thereby obtaining the optical fiber intermediate body 4.

(Curing Process)

In the curing unit 40, the coating layer of the optical fiber intermediate body 4 is cured by being irradiated by the UV lamps 40a, thereby obtaining the optical fiber 5.

The optical fiber 5 is changed in direction by the pulley 80, is taken up by the take-up unit 90, and is wound by the winder 100.

As described above, in the acceleration process (the stage at a low drawing velocity before the drawing velocity reaches a steady level), the outer diameter of the bare optical fiber 3 is likely to fluctuate. In addition, even after the drawing velocity reaches a steady level, there is a possibility that the outer diameter of the bare optical fiber 3 may vary.

In the manufacturing method of this embodiment, the flow rate of the fluid introduced into the direction changing devices 20A and 20B is controlled on the basis of the position and the outer diameter of the bare optical fiber 3 in the direction changing device 20B. Therefore, by controlling the flow velocity of the fluid discharged from the outlet 22 to the guide groove 21 in the direction changing devices 20A and 20B, the floatation amount of the bare optical fiber 3 can be adjusted.

Therefore, the contact between the bare optical fiber 3 and the inner side surface 21c of the guide groove 21 due to an insufficient floatation amount caused by a variation in the outer diameter of the bare optical fiber 3 can be avoided.

In addition, when the floatation amount of the bare optical fiber 3 becomes too high due to a variation in the outer diameter of the bare optical fiber 3, the floating state thereof may become unstable. However, by adjusting the floatation amount of the bare optical fiber 3, the floating state is stabilized, and the contact between the bare optical fiber 3 and the inner side surface 21c of the guide groove 21 can be prevented.

Therefore, the bare optical fiber 3 is not damaged by the direction changing devices 20A and 20B, and the operation ratio of the manufacturing apparatus 1 is increased, resulting in the enhancement of productivity. Therefore, a reduction in manufacturing costs can be achieved. In addition, the optical fiber 5 can be manufactured with a good yield.

Furthermore, after the drawing velocity reaches a steady level, the floating position of the bare optical fiber 3 in the direction changing devices 20A and 20B becomes stable, and thus the position of the bare optical fiber 3 that enters the coating unit 30 becomes constant. Therefore, the coating is prevented from having an uneven thickness, and the optical fiber 5 with stable quality can be manufactured.

EXAMPLE

Example 1

The manufacturing apparatus 1 shown in FIG. 1 was prepared. As the direction changing devices 20A and 20B, the direction changing device 201 shown in FIG. 3 was used.

As shown in FIG. 2, the inclination angle θ of the inner side surface 21c of the guide groove 21 with respect to the radial direction R was set to 0.5°. The width of the bottom of the guide groove 21 was set to 50 μm.

As the fluid introduced into the direction changing devices 20A and 20B, air was used.

As a result of a preliminary test, a floating turning radius of the bare optical fiber 3 (with an outer diameter of 125 μm) in a case where the flow rate of the air introduced into each of the direction changing devices 20A and 20B was set to 100 L/min was approximately 62.5 mm. Under this condition, it was confirmed that the floating position was more stable than in a case of another condition. Therefore, this position was determined as the optimal floating position of the bare optical fiber 3 having an outer diameter of 125 μm.

The first direction changing device 20A was provided at a position at which the temperature of the bare optical fiber 3 reached approximately 1000° C. The second direction changing device 20B was provided at a position separated by 1 m from the first direction changing device 20A on the downstream side in the drawing direction.

The bare optical fiber 3 (with an outer diameter of 125 μm) was obtained through drawing of the optical fiber preform 2 in the drawing unit 10.

The bare optical fiber 3 drawn vertically downward (the first path L1) from the optical fiber preform 2 was changed in direction to a horizontal direction (the second path L2) by the first direction changing device 20A, and was thereafter changed in direction to a vertically downward direction (the third path L3) by the second direction changing device 20B.

In the coating unit 30, the bare optical fiber 3 is coated with the UV-curable resin, and the coating layer was cured by being irradiated with UV light by the UV lamps 40a in the curing unit 40, thereby obtaining the optical fiber 5.

The optical fiber 5 was wound by the winder 100 via the pulley 80 and the take-up unit 90.

The position signal was output to the control unit 60 on the basis of the positional information of the bare optical fiber 3 obtained by the position detection unit 50, and the outer diameter signal was output to the control unit 60 on the basis of the outer diameter measurement value of the bare optical fiber 3 obtained by the outer diameter measurement unit 51.

As the control signals are output to the flow rate regulators 70A and 70B from the control unit 60, the flow rate of the fluid introduced into the direction changing devices 20A and 20B was controlled, thereby regulating the flow velocity of the fluid discharged from the outlet 22 to the guide groove 21. As the control method, PID control was employed.

Specifically, a floating turning radius of the bare optical fiber 3 of 62.5 mm determined when the outer diameter was 125 μm was determined as a central value. When the floating turning radius became lower than the central value, the flow rate of the fluid introduced into the direction changing devices 20A and 20B was increased, and when the floating turning radius became higher than the central value, the flow rate of the fluid introduced into the direction changing devices 20A and 20B was decreased.

At this time, the target floating position was calculated by using the above Expression (1) according to the outer diameter signal. According to the deviation between the target floating position and the central value of the floating turning radius of the bare optical fiber 3 when the outer diameter was 125 μm, the flow rate of the fluid introduced into the direction changing devices 20A and 20B was increased or decreased by the flow rate regulators 70A and 70B.

That is, in a case where the outer diameter of the bare optical fiber 3 was greater than 125 μm, the target floating position obtained by using the above-described Expression (1) became higher than the central value of the floating turning radius of the bare optical fiber 3 when the outer diameter was 125 μm. However, when a current floating position was the central value of the floating turning radius of the bare optical fiber 3 when the outer diameter was 125 μm, the deviation became a negative value, and the flow rate of the fluid introduced into the direction changing devices 20A and 20B was increased.

In a case where the outer diameter of the bare optical fiber 3 was smaller than 125 μm, the target floating position obtained by using the above-described Expression (1) became lower than the central value of the floating turning radius of the bare optical fiber 3 when the outer diameter was 125 μm. However, when a current floating position was the central value of the floating turning radius of the bare optical fiber 3 when the outer diameter was 125 μm, the deviation became a positive value, and the flow rate of the fluid introduced into the direction changing devices 20A and 20B was decreased.

The target floating position may be expressed as a position (radius) in the radial direction in the direction changing devices 20A and 20B.

According to the manufacturing method, the optical fiber 5 having a total length of 10,000 km was manufactured by using 10 optical fiber preforms 2. Since the acceleration process (the stage at a low drawing velocity before the drawing velocity reached a steady level) was performed on each of the 10 optical fiber preforms 2, there were a total of 10 acceleration processes.

When the manufacturing of the optical fiber 5 was started, the outer diameter of the bare optical fiber 3 was 135 μm, the drawing velocity of the optical fiber 5 was 1 m/s, and the drawing tension was 50 gf. In a stage in which the drawing velocity reached a steady level, the drawing velocity of the optical fiber 5 was 30 m/s±1 m/s, and the drawing tension was 150 gf±25 gf.

In the direction changing devices 20A and 20B, there was no significant variation in the floating turning radius of the bare optical fiber 3, and the bare optical fiber 3 was stably floated.

In this manufacturing method, the optical fiber 5 was manufactured, and a proof test was conducted. As a result, it was confirmed that the optical fiber 5 could be manufactured with a good yield without damaging the bare optical fiber 3 in the direction changing devices 20A and 20B.

Example 2

The optical fiber 5 was manufactured in the same manner as in Example 1 except that the above-mentioned target floating position was calculated using Expression (2) instead of Expression (1) in the acceleration process. In Expression (2), a was set to 0.5 [mm]. This value (0.5 [mm]) was determined by a preliminary test as a value which ensured a stable floatation amount, did not degrade floating stability, and had a sufficient margin for a control delay (such as a delay in response described above).

After the drawing velocity and the outer diameter of the optical fiber reached steady levels, control was performed by using the target floating position calculated using Expression (1).

As a result of a proof test, it was confirmed that the optical fiber 5 could be manufactured with a good yield without damaging the bare optical fiber 3 in the direction changing devices 20A and 20B.

Comparative Example 1

The optical fiber 5 was manufactured by using the same manufacturing apparatus as the manufacturing apparatus used in Example 1 except that the position detection unit 50 and the outer diameter measurement unit 51 were not included.

The flow rate of the air introduced into each of the direction changing devices 20A and 20B was set to a constant value (100 L/min).

The other conditions were similar to those of Example 1.

Regarding 10 optical fiber preforms 2, there was a stage at a low drawing velocity before each of the drawing velocity reached a steady level. Therefore, there were a total of 10 stages at a low drawing velocity. In seven of the stages, breaking of the bare optical fiber 3 occurred.

In addition, in a state in which the drawing velocity had reached a steady level, the drawing velocity of the optical fiber 5 was 30 m/s±1 m/s, and the drawing tension was 150 gf±25 gf. When the drawing tension varied, a variation in the floatation amount of the bare optical fiber 3 was seen.

As a result of a proof test, breaking of the bare optical fiber 3, which was thought to be caused by the contact between the bare optical fiber 3 and the inner side surface of the guide groove, had occurred. Therefore, it could not be said that a good manufacturing yield was achieved.

While the manufacturing method and the manufacturing apparatus of the optical fiber of the present invention have been described above, the present invention is not limited to the examples described above, and can be appropriately modified without departing from the spirit of the present invention.

For example, the number of direction changing devices used in the manufacturing method of the optical fiber of the present invention may be one or more. The two direction changing devices 20 are used in the manufacturing apparatus 1 shown in FIG. 1. However, the number of direction changing devices 20 may be one or an arbitrary number of three or more.

In a case where a plurality of direction changing devices is present, the position of the bare optical fiber is detected by at least one of the plurality of direction changing devices. The position of the bare optical fiber may be detected by all of the plurality of direction changing devices or some direction changing devices among the plurality of direction changing devices.

The flow rate of the introduced fluid is controlled preferably by all of the plurality of direction changing devices, but may also be controlled by some direction changing devices among the plurality of direction changing devices. The flow rate of the introduced fluid is controlled preferably by at least the direction changing device closest to the downstream side.

In the above-described embodiment, as a method of controlling the flow rate of the introduced fluid on the basis of the position of the bare optical fiber and the outer diameter measurement value, a method of controlling the flow rate of the introduced fluid so as to reduce the difference between the target floating position and the bare optical fiber was employed. However, the controlling method that can be employed by the present invention is not limited to the method in the embodiment.

For example, a method of correcting the flow rate of the introduced fluid so as to reduce a variation (standard deviation) in the position signal of the bare optical fiber while considering the difference between the target floating position and the position of the bare optical fiber may be employed. Otherwise, a method of correcting the flow rate of the introduced fluid so as to reduce a variation (standard deviation) in the outer diameter of the bare optical fiber while considering the difference between the target floating position and the position of the bare optical fiber may be employed. Furthermore, a method of correcting the flow rate of the introduced fluid so as to reduce a value obtained by subtracting a variation in the outer diameter signal of the bare optical fiber from a variation in the position signal of the bare optical fiber while considering the difference between the target floating position and the position of the bare optical fiber may be employed.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A manufacturing method of an optical fiber, the method comprising:
    drawing an optical fiber preform and forming a bare optical fiber;
    coating an outer circumference of the bare optical fiber with a coating layer comprising a resin;
    curing the coating layer and forming an optical fiber by curing the coating layer;
    changing a direction of the bare optical fiber using one or a plurality of direction changing devices at any position between a position where the bare optical fiber is formed and a position where the coating is performed;
    determining a target floating position in the one or a plurality of direction changing devices on the basis of a measurement value of an outer diameter of the bare optical fiber;
    comparing the target floating position and a result of detections of a position of the bare optical fiber to each other; and
    controlling a flow rate of a fluid introduced into the one or a plurality of direction changing devices so as to reduce a difference therebetween,
    wherein:
    the one or a plurality of direction changing devices comprise a guide groove which guides the bare optical fiber, and an internal space portion into which the fluid is introduced from an outside;
    in the guide groove, an outlet through which the fluid in the internal space portion is blown to float the bare optical fiber in the guide groove is formed;
    a position of the bare optical fiber at at least one of the one or a plurality of direction changing devices is detected, an outer diameter of the bare optical fiber is measured, and a flow rate of the fluid introduced into the direction changing devices is controlled on the basis of the position and the outer diameter of the bare optical fiber; and
    the target floating position is based on
        setting an inclination angle θ [°] of an inner side surface of the guide groove,
        detecting the outer diameter D [mm] of the bare optical fiber,
        setting the outer diameter $D_0$ [mm] of a reference bare optical fiber,
        calculating a relative, deviation Δr [mm], which represents a relative deviation of the optimal floating position from a reference position, of an optimal floating position of the bare optical fiber obtained in Expression (1):

$$\Delta r = \frac{D - D_0}{2 \times \tan\theta}, \text{ and} \qquad (1)$$

determining the target floating position as a position deviated from the reference position toward the outside in a radial direction by Δr.

2. The manufacturing method of an optical fiber according to claim 1, wherein the flow rate of the fluid introduced to all the direction changing devices among the one or a plurality of direction changing devices is controlled so as to reduce the difference between the result of the detection of the position of the bare optical fiber at at least one direction changing device among the one or a plurality of direction changing devices and the target floating position.

3. A manufacturing method of an optical fiber, the method comprising:

drawing an optical fiber preform and forming a bare optical fiber;

coating an outer circumference of the bare optical fiber with a coating layer comprising a resin;

curing the coating layer and forming an optical fiber by curing the coating layer;

changing a direction of the bare optical fiber using one or a plurality of direction changing devices at any position between a position where the bare optical fiber is formed and a position where the coating is performed;

determining a target floating position in the one or a plurality of direction changing devices on the basis of a measurement value of an outer diameter of the bare optical fiber;

comparing the target floating position and a result of detection of the position of the bare optical fiber to each other; and controlling a flow rate of a fluid introduced into the one or a plurality of direction changing devices so as to reduce a difference therebetween, wherein:

the one or a plurality of direction changing devices comprise a guide groove which guides the bare optical fiber, and an internal space portion into which the fluid is introduced from an outside;

in the guide groove, an outlet through which the fluid in the internal space portion is blown to float the bare optical fiber in the guide groove is formed;

a position of the bare optical fiber at at least one of the one or a plurality of direction changing devices is detected, an outer diameter of the bare optical fiber is measured, and a flow rate of the fluid introduced into the one or a plurality of direction changing devices is controlled on the basis of the position and the outer diameter of the bare optical fiber; and the target floating position is based on setting an inclination angle $\theta$ [°] of an inner side surface of the guide groove, detecting the outer diameter D [mm] of the bare optical fiber, setting the outer diameter $D_0$ [mm] of a reference bare optical fiber, setting an offset amount $\alpha$ [mm]

calculating a relative deviation $\Delta r$ [mm], which represents a relative deviation of the optimal floating position from a reference position, of an optimal floating position of the bare optical fiber obtained in Expression (2):

$$\Delta r = \frac{D - D_0}{2 \times \tan\theta} + \alpha, \text{ and} \qquad (2)$$

before a drawing velocity of the optical fiber reaches a steady level, determining the target floating position as a position deviated from the reference position toward the outside in a radial direction by $\Delta r$.

4. The manufacturing method of an optical fiber according to claim 3, wherein the flow rate of the fluid introduced to all the direction changing devices among the one or a plurality of direction changing devices is controlled so as to reduce the difference between the result of the detection of the position of the bare optical fiber at at least one direction changing device among the one or a plurality of direction changing devices and the target floating position.

* * * * *